Aug. 30, 1932.   F. N. STEIGLEDER   1,875,184
LIQUID INK ERASER FOR POCKET FOUNTAIN PENS AND DESK SET FOUNTAIN PENS
Filed Feb. 26, 1930   3 Sheets-Sheet 3

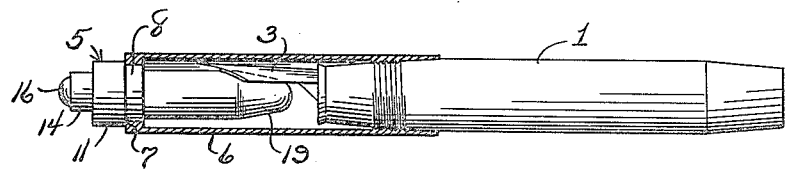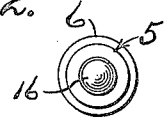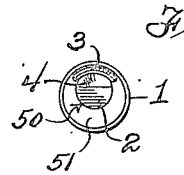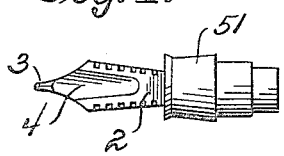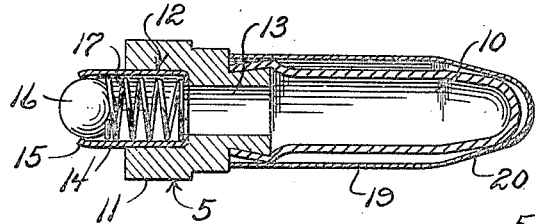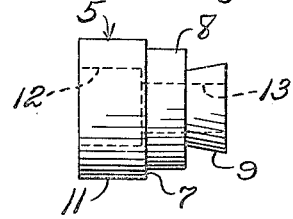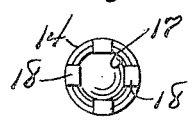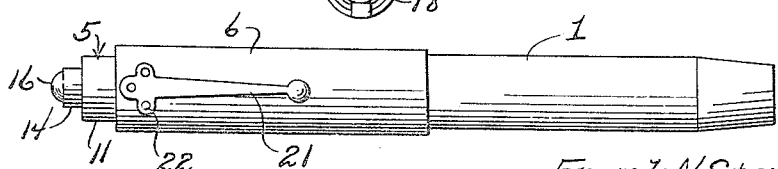

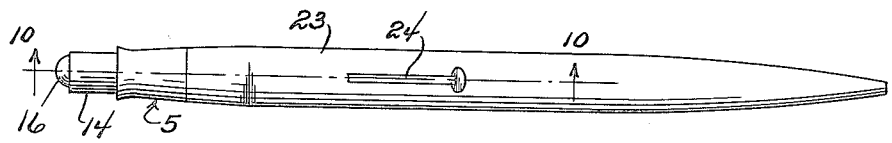
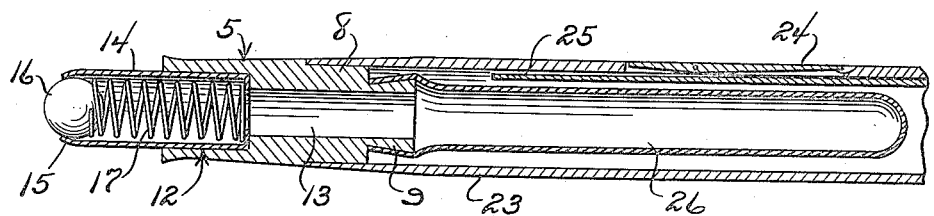
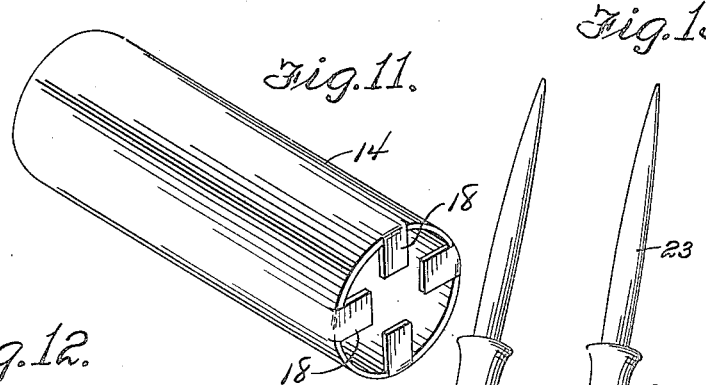
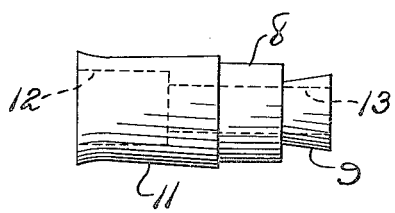
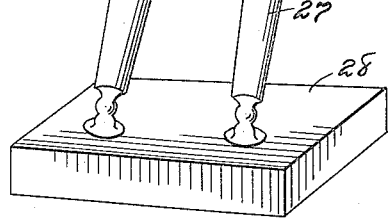

Frank N. Steigleder
INVENTOR
BY Victor J. Evans
ATTORNEY

Patented Aug. 30, 1932

1,875,184

UNITED STATES PATENT OFFICE

FRANK N. STEIGLEDER, OF DETROIT, MICHIGAN

LIQUID INK ERASER FOR POCKET FOUNTAIN PENS AND DESK SET FOUNTAIN PENS

Application filed February 26, 1930. Serial No. 431,485.

My present invention has reference to an ink eraser which may be attached to and form the end of the cap of a fountain pen and which may be attached to the tubular end of a holder which normally rests in the flexibly supported sockets for fountain pens or the like.

The object is the provision of an eraser for this purpose which includes a plug that affords one end of a cap or a holder, the said plug having mounted therein a sleeve that projects therefrom, the outer end of the sleeve being slightly bent inwardly to afford a seat for a ball valve which is influenced by a spring, the said plug having removably attached to its inner end a compressible sack for a liquid eradicator and such liquid being permitted to flow through the sleeve when the ball valve is slightly depressed or brought away from its seat and rolls over the inked surface of a paper to be erased.

A still further object is the provision of an ink eraser of this type in which the sack containing the liquid eradicating fluid is protected by a removable shield having an outer nose end which freely permits of the point of a fountain pen being arranged thereon and turned therearound, as when the device is employed in connection with a cap for a fountain pen.

A still further object is the provision of an ink eraser that employs an eradicating fluid, of a sleeve that provides a cage for a spring influenced ball valve, the said sleeve having its inner end formed with bendable flanges against which the spring makes contact, and the sleeve having its said inner end seated in a plug.

A still further object is the provision of a device which, while primarily designed as an eraser for an eradicating fluid may be also employed as a marking instrument.

To the attainment of the foregoing and other objects the invention consists in the improvement hereinafter described and definitely claimed.

In the drawings:

Figure 1 is a side elevation of my improvement applied to and closing the outer end cap of a fountain pen, the cap being in section.

Figure 2 is an end view of the improvement.

Figure 3 is an end view of the fountain pen.

Figure 4 is a bottom plan view illustrating the pen point and the feed plug therefor arranged in a plug that forms an important object of this invention, the figure also showing the outer face of the feed plug grooved or depressed for the reception of the nose end of the shield member of the improvement.

Figure 5 is a plan view of the device as illustrated by Figure 1.

Figure 6 is an approximately central longitudinal sectional view through the improvement.

Figure 7 is a side elevation, upon an enlarged scale of one form of plug.

Figure 8 is a rear end view of the metering sleeve.

Figure 9 is a plan view illustrating the improvement applied on a hollow holder.

Figure 10 is an enlarged sectional view approximately on the line 10—10 of Figure 9.

Figure 11 is a perspective view of the metering tube, looking toward the inner end thereof.

Figure 12 is a plan view of a plug which is of a greater length and less diameter than that disclosed by Figure 7.

Figure 13 is a perspective view to illustrate the manner in which the improvement is held in the sockets of desk sets.

Figure 14:
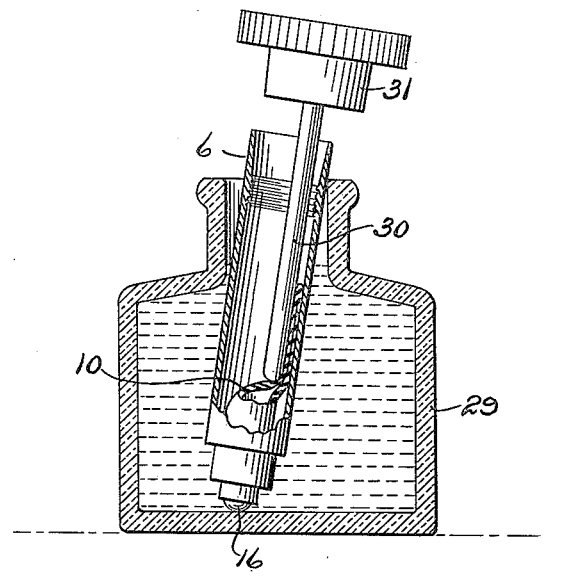
Figure 14 is a view to illustrate the manner in which the sack of the improvement is filled.

In Figure 1 of the drawings I have illustrated my improvement in the nature of a cap for a fountain pen. The fountain pen, indicated by the numeral 1, has the feed plug 2 for the pen nib 3 centrally notched or grooved, as at 4, on its outer face and from its outer end. The pen nib or point as well as the feed block 4 is arranged in the outer bore of a stepped plug 51 which forms an important element of my improvement and which will hereafter be described in detail. The tubular cap 6 for the fountain pen 1 has received in an opening in its outer end the plug 5. The plug frictionally engages with the wall of the opening, and the said outer end of the cap contacts with a shoulder 7 provided by the inner or central stepped portion 8 of the plug. The outer end of the plug is, of course, of a greater diameter than the central portion 8 and from the inner end of the said central portion there projects a flared extension 9 that is designed to have arranged therearound and tightly contact therewith the open end of a rubber or like elastic sack 10. The outer or closed end of the sack is flared inwardly as disclosed by Figure 6 of the drawings.

The plug 5, from its outer and widened end portion 11 is formed with a round pocket 12, the said plug being provided from its end 7 with a reduced bore 13 that centrally communicates with the pocket 12. The pocket 12 has frictionally received therein a metering tube 14, the said tube projecting a suitable distance beyond the plug. The metering tube is of brass and the outer end thereof has an inwardly beveled or flared portion 15 that affords a seat for a ball valve 16. The ball valve is closed onto its seat by a coil spring 17, and the inner end of the sleeve 14 is formed with four equidistantly spaced inwardly extending fingers 18 with which the spring contacts to urge the ball valve 16 onto its seat.

Designed to cover the sack 10 there is a tubular metal shield 19 which frictionally engages with the shouldered portion of the sack that is arranged over the outer corner of the beveled or flared extension or end 9 of the plug 5. The shield 19 is flared inwardly, as at 20, to the closed and rounded end thereof. This flared portion affords the shield with a conical nose and the nose is designed to be received in the longitudinal notch or depression 4 of the feed plug 2 for the pen point 3 when the cap 6 is screwed on the barrel of the fountain pen 1 as disclosed by Figure 1 of the drawings.

As far as the description has progressed it will be apparent that when the sack is filled with an ink eradicating fluid and the device is held either perpendicularly or at a desired angle and a sufficient pressure is exerted against the ball valve 16 to unseat the said valve a desired quantity of the fluid will pass through the sleeve 14 and will be delivered by the ball valve onto the ink to be erased when the device is manipulated to roll the ball valve over such surface.

As disclosed by Figure 5 of the drawings, the cap 6 is provided with a holder clip. The clip 21 has its widened end rounded and its edges provided with laterally extending rounded ears and through the extensions and through the ears there are passed rivets 22. It will be noted that three rivets are employed and these rivets frictionally hold the clip on the cap.

In Figures 9 and 10 both the metering tube or sleeve and the stepped plug are similar to those previously described, but the plug has its central stepped portion 8 frictionally engaged by a hollow holder 23. The holder is substantially similar to the barrel of a fountain pen, the same being provided with a pivotally supported lever 24 that is received through an opening in the holder and which is designed to contact with a spring presser plate 25 to force the same against the sack 26 whose mouth is received on the stepped end 9 of the plug.

As disclosed by Figure 13 of the drawings, the plug end of the desk set fountain pens are to be received in the sockets 27 of a desk set 28.

By reference to Figure 11 it will be noted that the inwardly directed fingers 18 on the metering tube or sleeve are flat and arranged flush with the ends of the sleeve on which they are formed or on which they are bent.

The stepped plugs disclosed in Figures 7 and 12 of the drawings, are of the same construction except they vary in thickness and in length.

Figure 15:
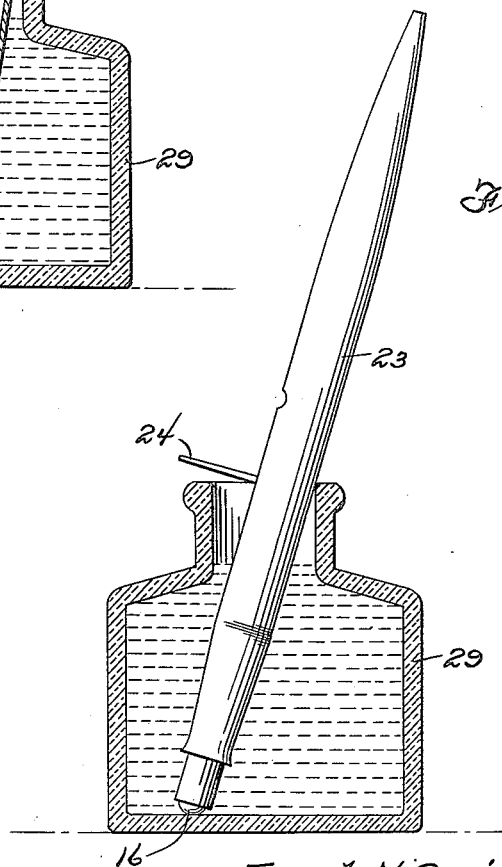
Figure 15 is a similar view to illustrate the manner in which the improvement when applied to a hollow holder is filled.

In Figure 14 I have illustrated the manner in which the compressible sack, which is attached to the cap 6, is filled. The bottle 29 holding the liquid eradicator has inserted through the mouth thereof the cap which carries both the stepped plug and the metering sleeve or tube. The brass shield is removed from the rubber sack and the stepped plug is arranged in the cap without this shield. The glass rod 30, which is attached to the rubber stopper 31 for the bottle 29 is employed for compressing the sack against the inner side of the cap and thereafter brought away from such contact to permit of the expansion of the sack and the filling thereof with the fluid in the bottle while in Figure 15 I have illustrated a manner in which the sacks 26 in the holder 23 are filled. This filling operation is similar to that of the filling of a fountain pen, the lever being swung outwardly to the position disclosed in said Figure 15 and when the lever is swung to closed position the sacks 26 will be expanded and draw the fluid into the said sack. In both instances a slight pressure is exerted to unseat the ball valve 16.

Obviously the compressible sack, the metering tube and the stepped plug are of different lengths and sizes to be accommodated in each other and on the cap, pen or holder to which these elements are applied. The improvement is not only designed as an ink eraser but may be also successfully employed for the metering of ink and writing fluids which permits of the device being employed as a pen for use in making a wide line such as in marking boxes, packages or the like as well as for lettering signs, etc. The liquid ink eradicator employed is known as a one fluid ink eradicator.

While as previously stated the plugs employed in the improvement are substantially similar in construction the plug disclosed by Figures 3 and 4 differ from those above described in the respect that the round opening in the outer stepped portion of the plug, indicated by the numeral 50, is arranged beyond the center of the said plug. The plug for distinction is also indicated by the numeral 51 and the feed plug 2 for the fountain pen nib 3 is, of course, received in the opening 50. This construction not only is desirable but essential inasmuch as the feed plug 2, being disposed beyond the center of the plug 51 provides all possible space necessary to make room for the shield over the rubber sack when the improvement is applied as disclosed by Figure 1 of the drawings. Thus the hole or opening 50 is made off the center in order to get the feed plug out of the way so that it will be possible to have the liquid ink eraser in its proper place when assembled.

The construction of my improvement is simple and the advantages thereof will, it is thought, be understood and appreciated by those skilled in the art to which such invention relates. However, I do not wish to be restricted to the precise details herein set forth and, therefore, hold myself entitled to make such changes therefrom as fairly fall within the scope of what I claim.

Having described the invention, I claim:

1. An eraser of the type described in which a liquid eradicator is employer, a plug, a metal sleeve partly let in the outer end of the plug and having its outer end portion beyond the end of the plug, said sleeve having its inner end provided with inwardly directed fingers and its outer end inwardly disposed to afford a valve seat, a ball valve for the seat, a spring in the sleeve and bearing at one end against the fingers and at its other end upon the valve to retard the turning movement thereof and exerting pressure between the fingers and the valve for seating the valve and said plug having a bore communicating with the inner end of the sleeve.

2. An eraser of the type described in which a liquid eradicator is employed, a plug, a metal sleeve partly let in the outer end of the plug and having its outer end portion beyond the end of the plug, said sleeve having its inner end provided with inwardly directed fingers and its outer end inwardly disposed to afford a valve seat, a ball valve for the seat, a spring in the sleeve and bearing at one end against the fingers and at its other end upon the valve to retard the turning movement thereof and exerting pressure between the fingers and the valve for seating the valve and said plug having a bore communicating with the inner end of the sleeve, the diameter of the bore being substantially equal to the diameter of the valve.

3. An eraser of the type described in which a liquid eradicator is employed, a plug, a metal sleeve partly let in the outer end of the plug and having its outer end portion beyond the end of the plug, said sleeve having its inner end provided with inwardly directed fingers and its outer end inwardly disposed to afford a valve seat, a ball valve for the seat, a spring in the sleeve and bearing at one end against the fingers and at its other end upon the valve to retard the turning movement thereof and exerting pressure between the fingers and the valve for seating the valve and said plug having a bore communicating with the inner end of the sleeve, the diameter of the bore being substantially equal to the diameter of the valve, the plug being provided at its inner end with a flared exterior surface, an elastic sack having an open end snugly receiving said flared end and a shield having an open end receiving that part of the sack which is applied to the flared end of the plug, said shield having an outer substantially cone-shaped closed end.

In testimony whereof I affix my signature.

FRANK N. STEIGLEDER.